(12) United States Patent
Rollender

(10) Patent No.: US 7,706,773 B2
(45) Date of Patent: Apr. 27, 2010

(54) SYSTEM AND METHOD FOR MANAGING COMMUNICATION SERVICES PROVIDED TO A MOBILE TERMINAL USING A TEMPORARY WIRELESS DIRECTORY NUMBER

(75) Inventor: Douglas Rollender, Bridgewater, NJ (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 434 days.

(21) Appl. No.: 11/520,637

(22) Filed: Sep. 14, 2006

(65) Prior Publication Data
US 2008/0070554 A1    Mar. 20, 2008

(51) Int. Cl.
H04M 11/04 (2006.01)
H04M 3/42 (2006.01)

(52) U.S. Cl. .................................. 455/404.1; 455/414.1

(58) Field of Classification Search .............. 455/414.1
See application file for complete search history.

(56) References Cited

U.S. PATENT DOCUMENTS

| | | | | |
|---|---|---|---|---|
| 5,222,128 A | * | 6/1993 | Daly et al. ............. | 379/221.04 |
| 6,081,590 A | * | 6/2000 | Crowley et al. ........ | 379/221.13 |
| 6,122,362 A | * | 9/2000 | Smith et al. .................. | 379/230 |
| 6,424,832 B1 | * | 7/2002 | Britt et al. ................. | 455/432.1 |
| 6,463,286 B1 | * | 10/2002 | Salminen ..................... | 455/453 |
| 6,775,546 B1 | * | 8/2004 | Fuller .......................... | 455/445 |
| 7,565,130 B2 | * | 7/2009 | Chin et al. ................. | 455/404.1 |
| 7,620,034 B1 | * | 11/2009 | Tran et al. .................... | 370/352 |
| 2002/0197991 A1 | * | 12/2002 | Anvekar et al. ............. | 455/432 |
| 2003/0157926 A1 | * | 8/2003 | Ala-Laurila et al. ......... | 455/406 |
| 2004/0215780 A1 | * | 10/2004 | Kawato ...................... | 709/226 |
| 2006/0072547 A1 | * | 4/2006 | Florkey et al. .............. | 370/352 |
| 2006/0205404 A1 | * | 9/2006 | Gonen et al. ............. | 455/432.1 |
| 2007/0054663 A1 | * | 3/2007 | Goldman et al. ......... | 455/432.1 |
| 2008/0039077 A1 | * | 2/2008 | Yang et al. ............... | 455/432.1 |

* cited by examiner

*Primary Examiner*—Lester Kincaid
*Assistant Examiner*—Yu (Andy) Gu
(74) *Attorney, Agent, or Firm*—Harness, Dickey & Pierce

(57) ABSTRACT

A system and method are provided for managing emergency services received by a mobile terminal having a temporary wireless directory number (TDN). The system includes an emergency call register (ECR) network and a disaster recovery call center (DRCC). The DRCC authorizes the mobile terminal to receive emergency services and provides service information for managing the emergency services to the ECR network if the mobile terminal is authorized to receive the emergency services.

3 Claims, 5 Drawing Sheets

SYSTEM AND METHOD FOR MANAGING COMMUNICATION SERVICES PROVIDED TO A MOBILE TERMINAL USING A TEMPORARY WIRELESS DIRECTORY NUMBER

BACKGROUND OF INVENTION

1. Field of the Invention

The present invention is related to a system and method for telecommunications. More particularly, the present invention relates to a system and method for managing use of a temporary wireless directory number, which may be used in emergency situations, to provide communication service to a mobile terminal.

2. Background Information

In wireless communication systems, a mobile directory number (MDN) is a dialable number associated with a mobile terminal. The MDN of a mobile terminal may be dialed by a caller and used to route a call through a communication network to a wireless subscriber's home system. Calls to a roaming wireless subscriber are routed to a mobile terminal at the serving system (SS) using a temporary long distance number (TLDN), as opposed to the MDN. The TLDN is similar to a call forwarding number provided by the serving system to the home system on request to deliver a call to a roaming mobile terminal.

However, in disaster situations, such as a hurricane or earthquake, one or more elements of a network necessary to route calls to a mobile terminal using the MDN or TLDN may be damaged, thereby by impairing and/or preventing communication services from being provided to a mobile terminal. For example, a situation may occur in which a mobile terminal can make outgoing calls as a roamer through a visited serving system, but cannot receive incoming calls through a home system, which may be out of service due to a disaster.

SUMMARY OF THE INVENTION

An example embodiment of the present invention provides a method of managing emergency services with respect to a mobile terminal. The method includes the steps of receiving a call from the mobile terminal; receiving a temporary directory number (TDN) for the mobile terminal and network information from a network; authorizing the mobile terminal to receive emergency services based on the call and the network information; and providing service information for managing the emergency services if the authorizing step authorizes the mobile terminal to receive the emergency services.

Another example embodiment of the present invention provides a system of managing emergency services with respect to a mobile terminal. The system includes an emergency call register (ECR) network receiving authorization to provide emergency services to the mobile terminal having an associated temporary wireless directory number (TDN); and a disaster recovery call center (DRCC) having a dialable number (DN), authorizing the mobile terminal to receive the emergency services, and providing service information to the ECR network to manage the emergency services using the TDN if the emergency services are authorized. The emergency call network may include a mobile switching center assigning the TDN to the mobile terminal in response to a call received from the mobile terminal directed to the DN of the DRCC; and at least one emergency call register receiving identification information from the mobile switching center, creating a disaster call recovery registration, and receiving the service information from the DRCC to provide the emergency services if the mobile terminal is authorized to receive the emergency services.

Still another example embodiment of the present invention provides a method of managing emergency services with respect to a mobile terminal. The method may include the steps of monitoring a first terminating switch having a local routing number (LRN) and serving the mobile terminal; determining if the first terminating switch is functioning properly based the monitoring step; and requesting that the LRN of the first terminating switch in a number portability database of a communication network be replaced by a temporary directory number (TDN) if the first terminating switch is determined to not function properly.

BRIEF DESCRIPTION OF THE DRAWINGS

Example embodiments of the present invention will become more fully understood from the detailed description provided below and the accompanying drawings, wherein like elements are represented by like reference numerals, which are given by way of illustration only and thus are not limiting of the present invention and wherein.

DETAILED DESCRIPTION OF EXAMPLE EMBODIMENTS

While example embodiments of the present invention are described below referring to ANSI-41 systems and using ANSI-41 identifiers, one skilled in the art will readily appreciate that the example embodiments are not limited to ANSI-41 systems. Accordingly, the teachings of the example embodiments are easily applied to various other systems such as Global Systems for Mobile Communication (GSM) systems. For example, the mobile directory number (MDN) referred to in an ANSI-41 system is substantially the same as the Mobile Station International Subscriber Directory Number (MSISDN) referred to in GSM systems.

Figure 1:
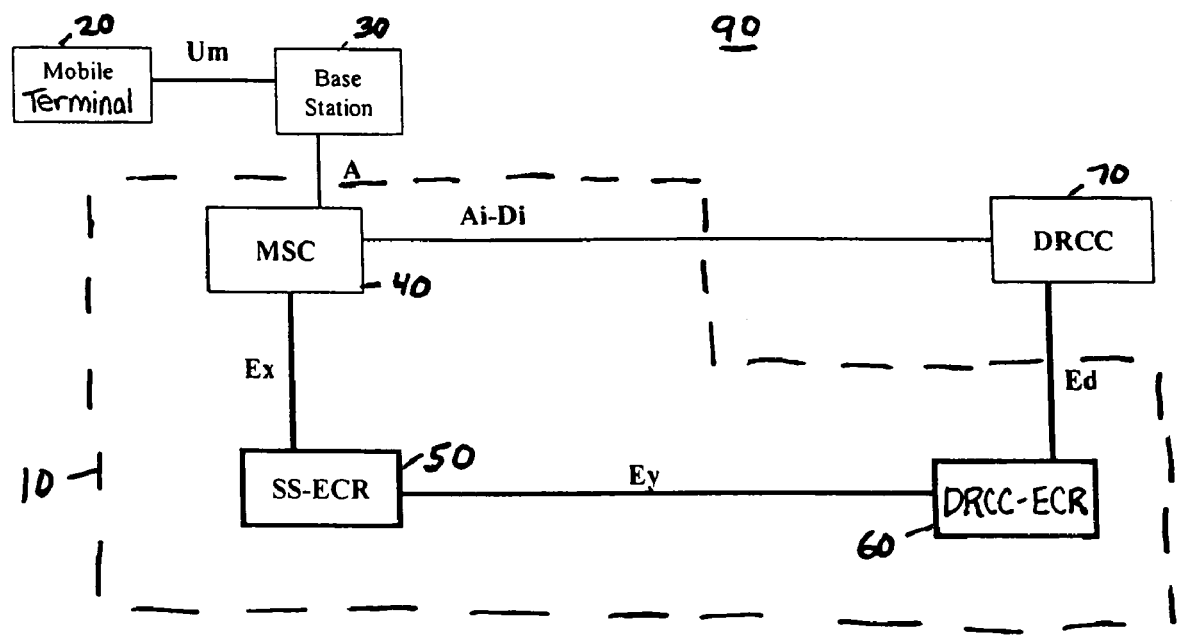
FIG. 1 is a block diagram of a telecommunications network architecture according to an example embodiment of the present invention.

Referring to FIG. 1, an example network architecture 90 is shown capable of a providing general communication services as well as emergency communication services to the mobile terminal 20 using a temporary wireless directory number (TDN) according to example embodiments of the present invention. Emergency communication services include general communication services provided to a mobile terminal using the TDN.

As shown in FIG. 1, the network architecture 90 includes a base station 30, an Emergency Call Register (ECR) network 10 and an example embodiment of a disaster recovery call center (DRCC) 70.

Emergency Call Register (ECR) Network

The ECR network 10 includes one or more Emergency Call Registers (ECRs) associated with various serving systems (SSs) and/or DRCCs and a mobile switching center (MSC) 40.

An Emergency Call Register (ECR) associated with a SS is referred to herein as a serving system emergency call register (SS-ECR). An ECR associated with a Disaster Recovery Call Center (DRCC) is referred to herein as a Disaster Recovery Call Center (DRCC-ECR). An ECR is a database holding emergency call detail information and call handling instructions for the MSC 40. The ECR database may include various information including, but not limited to, a paging identity (PGID) for a mobile terminal 20 originating a call to a dialable number (DN) of the DRCC 70 and a TDN assigned to the mobile terminal 20.

The DN of the DRCC 70 may be similar to "9-1-1," which is used in the United States for emergency calls to a local public safety agency, or could be a toll free "800" number provided by the mobile subscriber's home service provider or the service provider of a visited serving system for use in disaster situations. Accordingly, a subscriber who is not receiving full communication services for their mobile terminal 20 during a disaster may contact the DRCC 70 using the DN associated with the DRCC 70.

The PGID stored in the ECR may be used to page the mobile terminal 20. The PGID is usually the mobile subscription identity (MSID) programmed into either the resident memory of the mobile terminal 20 or on a SIM card inserted into the mobile terminal 20. The MSID is signaled from the mobile terminal 20 to the base station 30 inside a call origination request message.

The TDN stored in the ECR is used to provide communication services to the mobile terminal 20 in disaster situations. The TDN may be drawn from a native NPA-NXX number block of the MSC 40 in the SS. A NPA-NXX number block is assigned to every SS from which 10-digit TDNs are drawn and assigned to mobile terminals in disaster situations.

The MSC 40 of the ECR network 10 receives calls from and routes calls to the mobile terminal 20 as is well-known in the art. However, according to an example embodiment of the present invention, the MSC 40 participates in providing communication services to the mobile terminal 20 in a disaster situation using a TDN as detailed below.

Referring to FIG. 1, a call originated to the DN of the DRCC 70 by the mobile terminal 20 may be conveyed to the DRCC 70 by the base station 30 and the MSC 40. Receiving a call directed to the DN of the DRCC 70, triggers the MSC 40 to assign a TDN to the mobile terminal 20 and to update ECRs of the ECR network 10 by creating a disaster recovery call registration in the SS-ECR 50. The disaster recovery call registration includes the TDN assigned to the mobile terminal 20 and the PGID of the mobile terminal 20 originating the call to the DN of the DRCC 70.

The MSC 40 updates the ECRs by communicating identification information associated with the mobile terminal 20, which includes the assigned TDN, to the SS-ECR 50. This identification information is communicated to the SS-ECR 50 over a first interface $E_x$ and may further include the mobile equipment identification number (MEIN) of the mobile terminal 20, the PGID of the mobile terminal 20, and the geographic location of the mobile terminal 20 or the base station serving the mobile terminal 20. Once the SS-ECR 50 is updated, the SS-ECR 50 provides the identification information received from MSC 40 to the DRCC-ECR 60 over a network interface $E_y$ to update the DRCC-ECR 60. The DRCC-ECR 60 communicates with the DRCC 70 through the $E_d$ interface. The E interfaces depicted in FIG. 1 support signaling of data and service requests through ECR network 10 between MSC 40 and DRCC 70.

It is noted that the SS-ECR 50 and DRCC-ECR 60 may be realized by one or more databases. It is also noted that the SS-ECR 50 and DRCC-ECR 60 may be implemented as a single entity. As shown, however, SS-ECR 50 and DRCC-ECR 60 are individual elements to allow consideration for one SS-ECR 50 to serve one MSC 40 and one DRCC-ECR 60 to interface with many ECRs associated with the DRCC 70. While one DRCC-ECR may serve many DRCCs, one DRCC need only interface with one ECR.

In addition to assigning the TDN to the mobile terminal 20 and updating the ECRs of the ECR network 10, the MSC 40 connects the call from the mobile terminal 20 to the DRCC 70 and provides voice and call data to the DRCC 70. According to one example embodiment of the present invention, the call data includes the TDN assigned by the MSC 40 to the mobile terminal 20. In other example embodiments, the call data includes an ECR data key, which is used by the DRCC 70 to obtain the assigned TDN from the DRCC-ECR 60. The voice and call data may be transmitted to the DRCC 70 via a conventional ISDN connection Ai-Di. Alternatively, the voice and call data could be delivered during a VoIP session using an IP address Disaster Recovery Call Center (DRCC)

The DRCC 70 is configured to manage emergency services provided to the mobile terminal 20 by authorizing and controlling use of a TDN assigned to the mobile terminal 20.

The DRCC 70 receives voice and call data from the MSC 40 and ECR data from the ECR network 10. The DRCC 70 uses the call data received from the MSC 40 to associate information received over the voice channel (e.g., Ai-Di) with the ECR data.

The ECR data is data received from the ECR network 10 either automatically or in response to a query from the DRCC 70. The ECR data includes the PGID or the equipment identifier (e.g., serial number) from the mobile terminal 20, which is stored in the DRCC-ECR 60 along with the TDN. The ECR data may be received by the DRCC 70 over an interface Ed from the DRCC-ECR 60. Further, the DRCC 70 may obtain additional ECR data from researching historical call records in various ECRs to identify other calls from the mobile terminal 20.

Based on the ECR data and the voice and call data, the DRCC 70 determines whether to authorize the mobile terminal 20 to use the assigned TDN. As described above, a subscriber using the mobile terminal 20 to call the DN of the DRCC 70 is assigned a TDN by the MSC 40. The TDN is assigned to the mobile terminal 20 for at least the duration of the call to the DRCC 70. If the DRCC 70 does not authorize the subscriber to continue using the TDN after the call, the TDN is released by the DRCC 70 for use by a subsequent caller as soon as the first subscriber's call is disconnected. If, on the other hand, the DRCC 70 authorizes the subscriber to use the TDN for a period of time after the completion of the call to the DRCC 70, such as the duration of the disaster, then others are able to contact the subscriber by dialing the TDN assigned to the mobile terminal 20 or by having their calls to the subscriber's non-working MDN forwarded to the TDN. The specific functions and operations of the DRCC 70 are described in greater detail below with reference to FIGS. 2 and 3.

Figure 2:
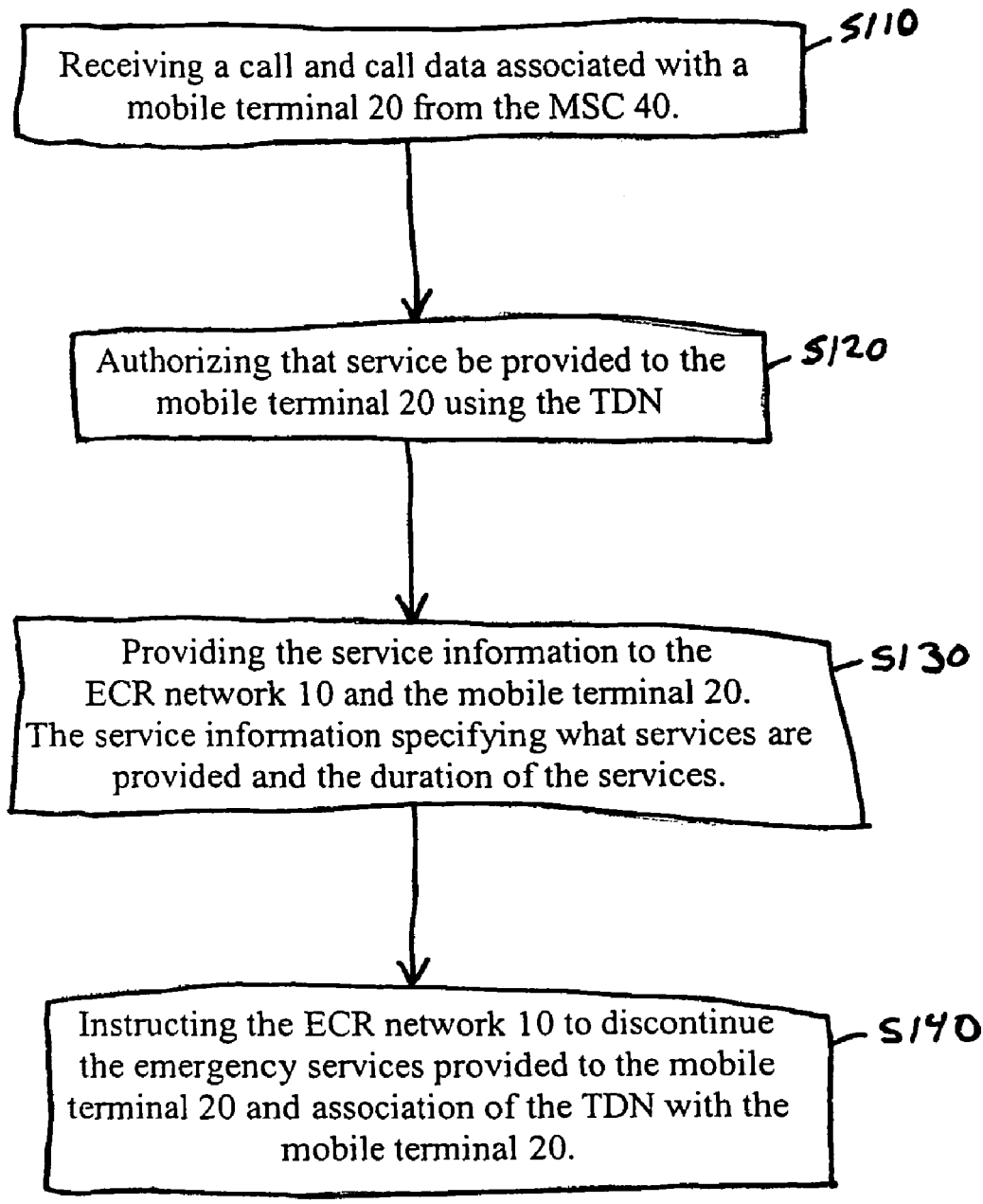
FIG. 2 is a flow chart illustrating a method of authorizing and controlling use of a temporary wireless directory number to provide communication service to a mobile terminal according to an example embodiment of the present invention.

FIG. 2 illustrates an example embodiment of a method for managing use of TDNs, which may be used in emergency situations, to provide communication services to mobile terminals. The method illustrated in FIG. 2 is performed by the DRCC 70 according to an example embodiment of the present invention.

Referring to FIG. 2, the DRCC 70 receives a call originated from the mobile terminal 20 and call data associated with the mobile terminal 20 from the MSC 40 (S110). The call data includes the TDN assigned by the MSC 40 to the mobile terminal 20 or an ECR data key that allows the assigned TDN to be obtained from the DRCC-ECR 60. The TDN and all other data relating to the mobile terminal 20 in the ECR network 10 are associated with the ECR data key. Accordingly, if the ECR data key is signaled with the call to the DRCC 70, the DRCC 70 may query the DRCC-ECR 60 to obtain the TDN and ECR data. The DRCC 70 may query the DRCC-ECR 60 manually or automatically.

During the call, the DRCC 70 may obtain request information from the subscriber using the mobile terminal 20. For example, an operator at the DRCC 70 may ask the subscriber a variety of questions, which may be used to determine whether to authorize service for the TDN assigned to the mobile terminal 20 by the MSC 40.

In a disaster situation when a communication network is not operating properly, the DRCC 70 is used to manage limited communication resources. Accordingly, the DRCC 70 may collect the request information from the subscriber used to assign the use of the limited communication resources. For example, if a first subscriber is in dangerous location and a second subscriber is affected by the disaster, but is in a safe location, this information is used by the DRCC 70 to authorize the use of a TDN to the first subscriber before authorizing use of a TDN to the second subscriber. Further, the DRCC 70 may request billing information from the subscriber requesting use of a TDN for the mobile terminal 20. Still further, the DRCC 70 may provide service information to the subscriber during the call between the subscriber and the DRCC 70. For example, the DRCC 70 may inform a subscriber that the TDN assigned to the subscriber's mobile terminal 20 will be operational at a specified time and/or for a specified time duration. For example, the subscriber may be informed by a DRCC 70 operator of the TDN assigned to the mobile terminal 20; that the service is effective immediately; and that the service will be operational for the next eight hours. In this example scenario, the subscriber can then inform others that the subscriber can be reached using the TDN for the next eight hours.

After receiving and processing various information, the DRCC 70 authorizes the use of the TDN with the mobile terminal 20 (S120). The various information includes the voice and call data, request information, ECR data and ECR network information. The ECR network information includes, for example, the number of TDNs available, an indication of network congestion, the number of received TDN requests and expected duration of network component outages. The DRCC 70 authorizes use of the TDN for the mobile terminal 20 by communicating an authorization to the DRCC-ECR 60. The DRCC-ECR 60 will then communicate the authorization to the SS-ECR 50. The DRCC-ECR 60 and SS-ECR 50 will update, thereby enabling the mobile terminal 20 to receive calls dialed to the TDN and delivered to the serving MSC 200.

In addition to the authorization, the DRCC 70 provides service information to the ECR network 10 (S130). This service information determines what services and the duration of the services to be provided to the mobile terminal 20 in connection with the assigned TDN. This service information may be transmitted concurrently with the authorization or shortly thereafter. Alternatively, the service information may be provided to the DRCC-ECR 60 in response to a query generated by the DRCC-ECR 60 once the DRCC-ECR 60 receives and processes the authorization to provide service to the mobile terminal 20 using the TDN. For example, the DRCC-ECR 60, in response to the authorization received from the DRCC 70, may query the DRCC 70 requesting the parameters of the service.

When the TDN assigned to the mobile terminal 20 expires, the DRCC 70 instructs the ECR network 10 to discontinue the association of the assigned TDN with the mobile terminal 20 (S140), thereby ending the communication services provided to the mobile terminal 20 with the TDN. The expiration of the TDN may occur in a variety of ways. For example, the TDN may expire once services to the normal MDN of the mobile terminal 20 are restored, when the TDN is needed for a higher priority subscriber or when the time duration of the subscribers use is over.

Figure 3:
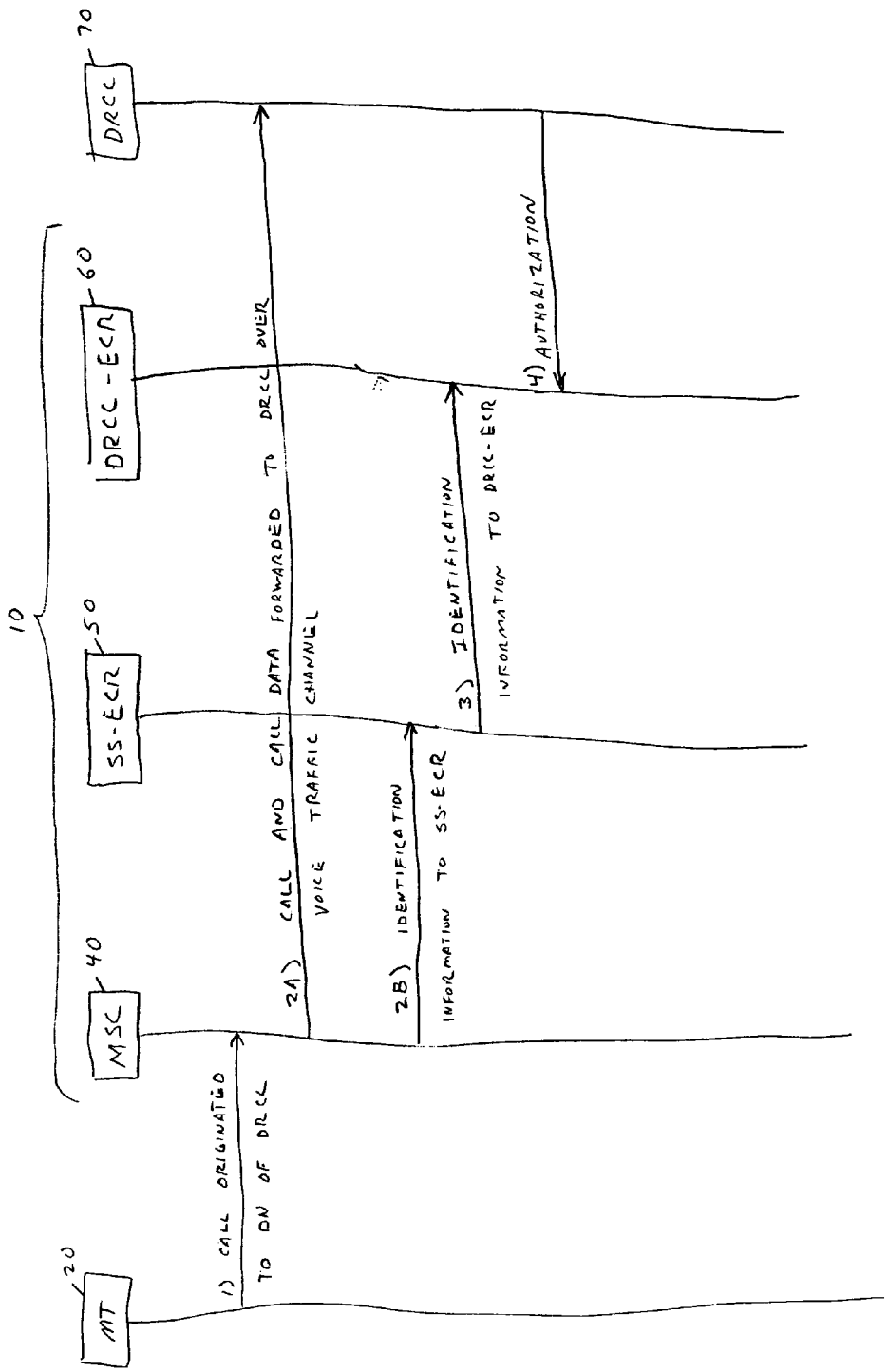
FIG. 3 is a message flow diagram representing an example embodiment of the present invention.

FIG. 3 is a message flow diagram illustrating communication between a mobile terminal 20; the ECR network 10 including the MSC 40, SS-ECR 50 and DRCC-ECR 60; and a DRCC 70 according to an example embodiment of the present invention. The message flow diagram of FIG. 3 begins with message 1 representing a call originated from the mobile terminal 20 to a DN of the DRCC 70, which is received by the MSC 40 . In response to receiving the call directed to the DN of the DRCC 70, the MSC transmits messages 2a and 2b to the DRCC 70 and SS-ECR 50, respectively. It is noted that the standards used for these transmissions are well-known and thus, are not be discussed herein for the sake of brevity.

Message 2A represents data communicated to the DRCC 70 over a voice traffic channel. The voice traffic channel allows transmission of both the voice data and the call data including the TDN or ECR data key. Over this voice traffic channel, the subscriber of the mobile terminal 20 may request communication services from the DRCC 70 and provide request information to the DRCC 70.

As shown by message 2B, in response to the call received from the mobile terminal 20 to the DN of the DRCC 70, the MSC 40 forwards identification information including the TDN to the SS-ECR 50. The SS-ECR 50 then communicates the identification information to the DRCC-ECR 60 as shown by message 3. Messages 2a and 3 are used to update the SS-ECR 50 and the DRCC-ECR 60 to associate the TDN assigned by the MSC 40 with the mobile terminal 20 and the ECR data relating to the mobile terminal 20.

Once the SS-ECR 50 and DRCC-ECR 60 are updated to include the TDN assigned to the mobile terminal 20, the SS-ECR 50 and DRCC-ECR 60 wait on an authorization from the DRCC 70 indicating that communication services should be provided to the mobile terminal 20 using the assigned TDN for specified period of time.

As shown by message 4, the DRCC 70, then provides the authorization to the DRCC-ECR 60, which in turn provides the authorization to the SS-ECR 50.

Once the TDN services are authorized, if the MSC 40 receives a call directed to the TDN, the MSC 40 routes the call to the mobile terminal 20. This is done by, first, the MSC 40 recognizing the inbound called party number as a TDN. If the called party number is a working TDN, then the MSC 40 interrogates the SS-ECR 50 to obtain the PGID of the mobile terminal 20 being called. If the TDN is still active and authorized, the SS-ECR 50 returns the PGID of the mobile terminal 20 being called to the MSC 40 . The MSC 40 uses the PGID to page the mobile terminal 20 and complete the call. If the initial TDN assignment has expired and the TDN has been assigned to a second mobile terminal, the second mobile terminal will be paged even though the caller may have intended to reach the mobile terminal 20, which was previously associated with the TDN. As a result, some aging of vacated TDNs is recommended before the vacated TDNs are re-used.

However, if a caller attempting to contact the first subscriber using the TDN un-intentionally reaches the mobile terminal of a second subscriber now using the TDN, the caller may call the DN of the DRCC 70 and request assistance in reaching the first subscriber. In response to this request, the DRCC 70 may query the DRCC-ECR 60 to locate the first subscriber and, if necessary, obtain a new TDN so that the first subscriber can be reached by the caller. In this example embodiment, the DRCC 70 updates the TDN in the ECR, instead of the MSC 40, based upon a caller's request to the DRCC 70.

Figure 4:
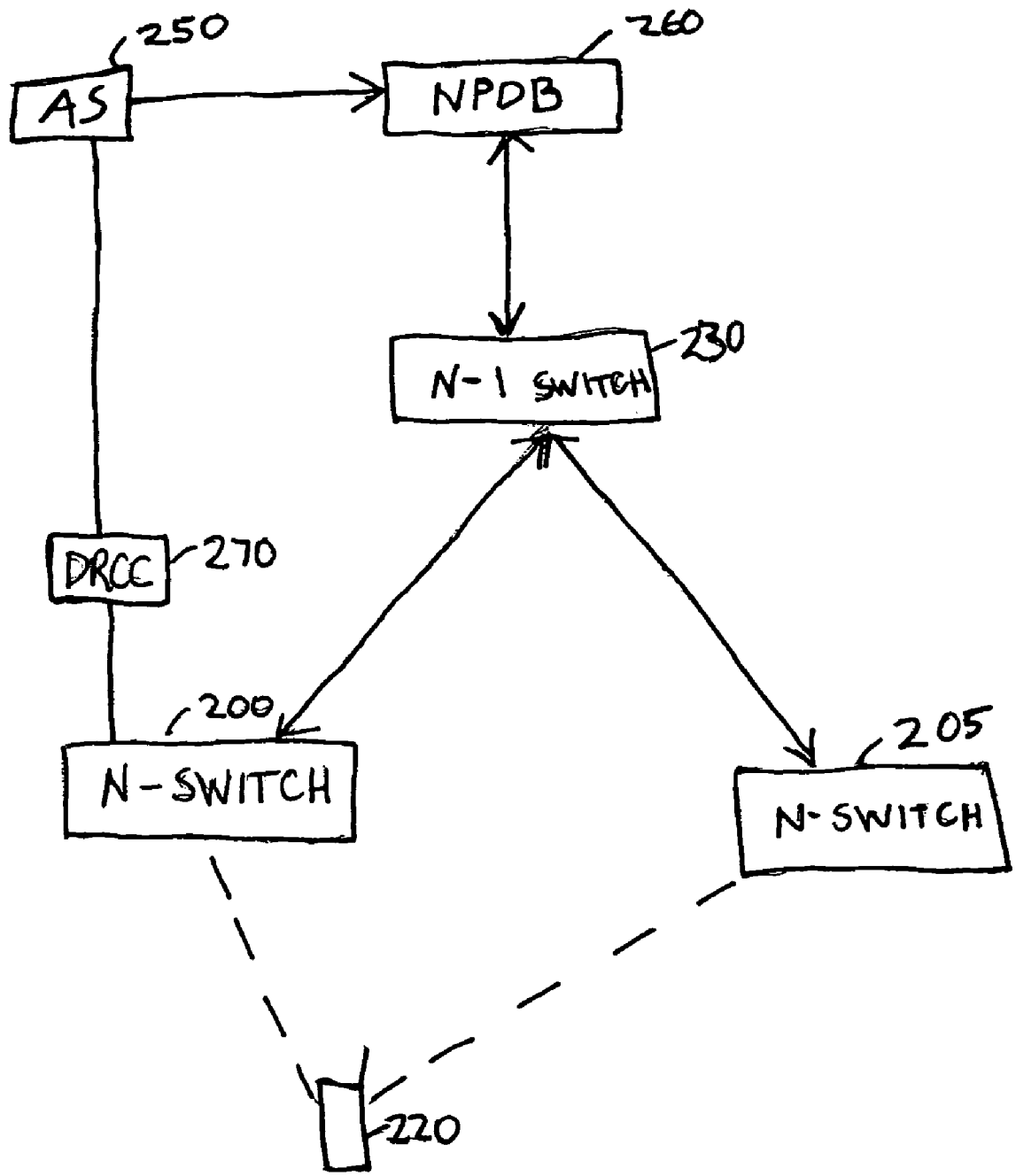
FIG. 4 is a block diagram of a telecommunications network architecture according to another example embodiment of the present invention.

In the following example embodiment of the present invention, the DRCC requests that a number portability database (NPDB) be updated to include the TDN for subscribers affected by a disaster. FIG. 4 illustrates an example communication network for describing this example embodiment of the present invention.

The communication network shown in FIG. 4 includes a plurality of MSCs referred to in this example embodiment as first and second terminating switches 200 and 205, a transit N-1 switch 230, an NPDB 260, an Administrative System (AS) 250 and a DRCC 270.

According to this example embodiment of the present invention, the DRCC 270 monitors a first terminating N switch 200, identifies if the first terminating N-switch 200 is malfunctioning and requests that a TDN serviced by a second terminating N switch 205 be used to provide emergency services to a mobile terminal 220 normally serviced by the first terminating N switch 200. The specific functions and operations of the DRCC 270 will be described in greater detail following the description of the first and second terminating N switches 200 and 205, the transit N-1 switch 230, the NPDB 260 and the AS 250.

The first and second terminating N switches 200 and 205, under normal conditions, function as terminating switches for mobile terminals. Referring to FIG. 4, under normal operating conditions, the first terminating N switch 200 serves as the terminating switch for the mobile terminal 220. The transit N-1 switch 230 is a switch that routes calls directed to the mobile terminals to the appropriate terminating switches as is well-known in the art. Every terminating switch has a designated LRN used to route calls through transit switches.

The AS 250 is used to maintain and update the NPDB 260. The AS 250 may be owned by a service provider, for example. An NPDB is well-known and is a database used by transit N-1 switches to route calls to the appropriate terminating switches. Each subscriber included in the NPDB has a DN and an LRN identifying the terminating switch of each subscriber. For example, when the transit N-1 switch 230 receives a call directed to a MDN of the mobile terminal 220 under normal operating conditions, the transit N-1 switch 230 determines that the first terminating N switch 200 services the mobile terminal 220 through a query of the NPDB 260. In reply to the query, the NPDB 260 provides the LRN of the first terminating N switch 200 associated with the MDN of the mobile terminal 220. At the first terminating N switch 200, the call is terminated and delivered to the mobile terminal 220.

However, in a disaster situation, the first terminating N switch 200 may malfunction and thus, not be able to provide service to the mobile terminal 200. In this situation, if the transit N-1 switch 230 attempts to route a call using the LRN of the first terminating N switch 200, the call cannot be completed to the first terminating N switch 200.

Figure 5:
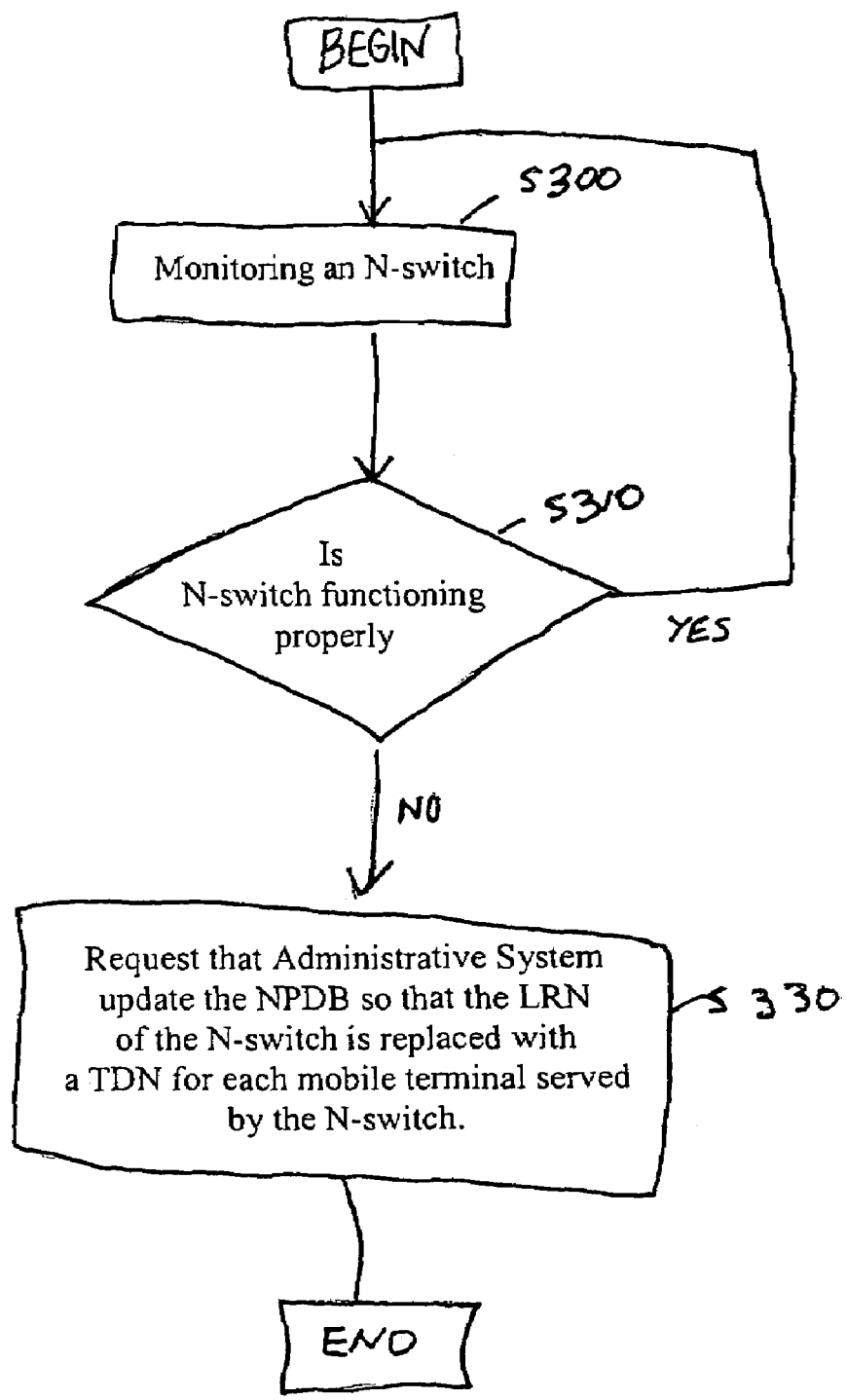
FIG. 5 is a flow chart illustrating a method of providing emergency services to a mobile terminal using a temporary directory number (TDN) according to another example embodiment of the present invention.

The method illustrated in FIG. 5 is performed by the DRCC 270 according to an example embodiment of the present invention and may be implemented in situations such as the one described above where the first terminating N switch 200 is malfunctioning.

Referring to FIGS. 4 and 5, the DRCC 270 is associated with the first terminating N-switch 200 and monitors the first terminating N-switch 200 (S300). To monitor the first terminating N switch 200, the DRCC 270 regularly connects with the first terminating N-switch 200 using the LRN of the first terminating N-switch 200 and/or performs tests on the on the first terminating N switch 200. There are many well-known tests that can be performed on terminating switches. Accordingly, these well-known tests are not described herein for the sake of brevity.

By monitoring the first terminating N switch 200, the DRCC 270 determines if the first terminating N-switch 200 is functioning properly (S310). If the DRCC 270 determines the first terminating N switch 200 is functioning properly, the DRCC 270 merely continues to monitor the first terminating N switch 200.

However, if the DRCC 270 determines the first terminating N switch 200 is no longer functioning properly and receives a request for a TDN from a subscriber served through that non-functioning first terminating N switch 200, the DRCC 270 requests that the AS 250 update the NPDB 260 to replace the LRN of the first terminating N switch 200 with a TDN assigned to the mobile terminal 220. In the example embodiment shown in FIG. 4, the assigned TDN is serviced by the second terminating N switch 205.

Once the NPDB 260 is updated, when the transit N-1 switch 230 queries the NPDB 260 using the MDN served by the non-functioning first terminating switch 200, the TDN assigned to the mobile terminal 220 is signaled to the N-1 transit switch 230 instead of the LRN of the non-functioning terminating switch 200. The N-1 transit switch 230 then forwards the TDN to the second terminating N switch 205. The second terminating N switch 205, which is serving the mobile terminal 220 during the disaster, receives the TDN from the transit N-1 switch 230. When the second terminating N switch 205 receives the TDN, the second terminating N switch 205 recognizes the TDN and uses the TDN to query an SS-ECR (not shown in FIG. 4) to obtain the PGID of the mobile terminal 220. If the PGID is returned from the SS-ECR the call is completed to the mobile terminal 20, otherwise the MSC performs its normal procedures for misrouted calls.

According to this example embodiment, each mobile terminal served by the first terminating N switch 200 may be assigned a TDN served by a second terminating N switch 205, thereby allowing the transit N-1 switch 230 to continue to route calls to the mobile terminals formerly served by the malfunctioning first terminating N switch 200.

Example embodiments of the present invention being thus described, it will be obvious that the same may be varied in many ways. Such variations are not to be regarded as a departure from the invention, and all such modifications are intended to be included within the scope of the invention.

What is claimed:

1. A method of managing emergency services with respect to a mobile terminal comprising:

monitoring a first terminating switch having a local routing number (LRN) and serving the mobile terminal;

determining if the first terminating switch is functioning properly based the monitoring step; and requesting that the LRN of the first terminating switch in a number portability database of a communication network be replaced by a temporary directory number (TDN) if the first terminating switch is determined to not function properly.

2. The method of claim 1, further comprising:

providing the emergency services to the mobile terminal using the TDN if the LRN is replaced with the TDN in the number portability database.

3. The method of claim 2, wherein the providing step provides the emergency services to the mobile terminal through a second terminating switch.

\* \* \* \* \*